May 20, 1952 W. C. LATHERS, JR 2,597,111
PLANT GUARD FOR CULTIVATORS
Filed Dec. 20, 1946 2 SHEETS—SHEET 1

INVENTOR
WILLIAM C. LATHERS, JR.
BY
Wheeler, Wheeler & Wheeler
ATTORNEYS

May 20, 1952 W. C. LATHERS, JR 2,597,111
PLANT GUARD FOR CULTIVATORS
Filed Dec. 20, 1946 2 SHEETS—SHEET 2

INVENTOR
WILLIAM C. LATHERS, JR.
BY Wheeler, Wheeler & Wheeler
ATTORNEYS

Patented May 20, 1952

2,597,111

UNITED STATES PATENT OFFICE 2,597,111

PLANT GUARD FOR CULTIVATORS

William C. Lathers, Jr., Madison, Wis.

Application December 20, 1946, Serial No. 717,447

6 Claims. (Cl. 97—188)

This invention relates to improvements in plant guards for cultivators, with particular reference to guards of that type which straddle rows of plants at the sides of the cultivator teeth to prevent the plants from being covered with earth lifted by the teeth plowing through the soil adjacent to the plants.

Objects of this invention are to provide a guard which will not conceal the plants from the operator of the cultivator, which will not damage the plants, which will allow the plants to be mulched by the finer particles of the cultivated soil, and which will have fore and aft suspension linkage allowing the guard to swing in a vertical plane which includes the row of plants, whereby to clear obstructions upon which it might otherwise catch.

A further object is to provide means for laterally adjusting the guard in order to properly cover plants in differently spaced rows, or to vary the space between the guard and the cultivator teeth.

A still further object is to provide means for varying the quantity of mulch which is permitted to pass through the guard, whereby the latter may be adapted to the requirements of either heavy or light soils.

In the following description

Like parts are identified by the same reference characters throughout the several views.

Figure 1:
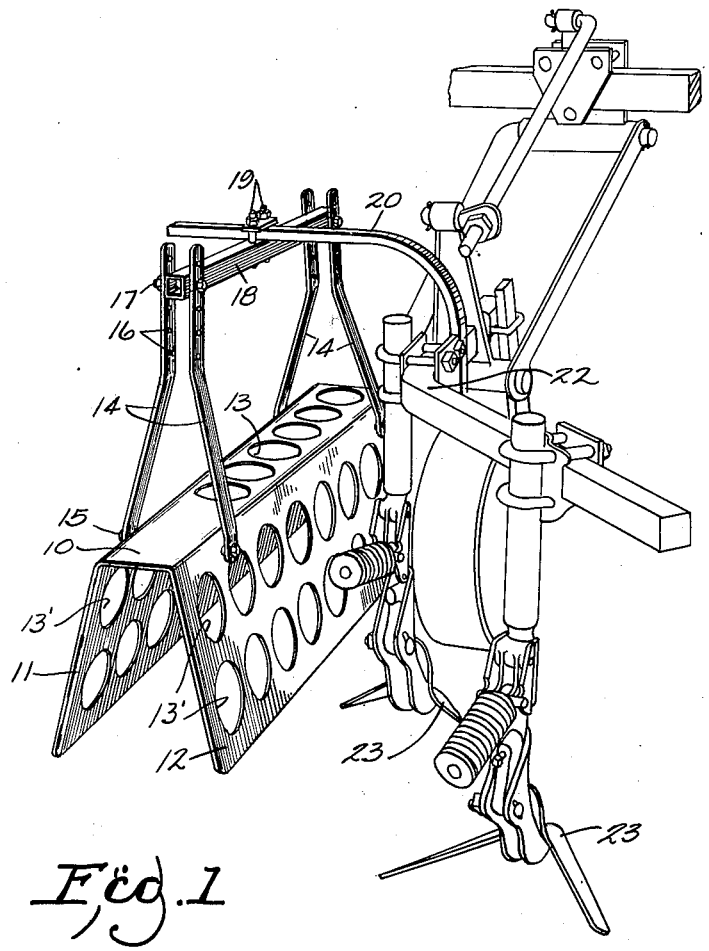
Figure 1 is a perspective view of a plant guard embodying my invention as seen from the point of view of the operator of a cultivator to which it is attached, the cultivator teeth, pilot wheel, and parts of the cultivator frame being indicated by dotted lines.

My improved guard is formed of sheet metal, provided with multiple longitudinally extending rows of holes, and bent along longitudinal lines to form a substantially flat top 10 and sides 11 and 12 which preferably diverge downwardly, as shown. The top may be provided with one row of holes 13, and the sides will preferably have at least two longitudinally extending rows of holes 13'. Each end portion of the guard is supported by a pair of links 14, the lower ends of which are pivotally connected with the sides of the guard at 15. The upper end portions of these links are provided with vertical rows of holes 16 through any one of which a pivot pin 17 may be inserted to connect the link with a guard supporting bar 18.

An intermediate portion of the bar 18 is adjustably connected by clamping bolts 19 with an elbowed arm 20 adapted to be attached to any ordinary cultivator frame member, such, for example, as the bar 22, to which the cultivator teeth 23 are attached.

One or more of these guards may thus be supported, each in a position to straddle a row of plants adjacent to the cultivator teeth. The guards are of sufficient length to protect the plants in the row from being covered or broken down by earth plowed up by cultivator teeth working in close proximity to the row, although the supporting links 14 will ordinarily be adjusted to normally hold the guards with their lower margins two or three inches above the surface of the ground, and finely divided portions of the soil plowed up by the cultivator teeth may pass under the guards or through some of the holes in the sides thereof, particularly the lower row of holes, and thus mulch the plants and smother small weeds without covering or otherwise injuring the plants.

When the cultivator is working in finely divided or sand soil, the quantity of mulch passing through the holes 13' may be limited by inserting in at least the lower row of holes on each side of the guard a flexible, and preferably resilient, member 25. One end of this bar may be passed inwardly through alternate holes and outwardly through intermediate holes in any row, thus partially closing each of the holes in that row. One end of the bar 25 may be provided with a hook 26 to embrace an end margin of the guard for additional security against displacement of the bar. However, the friction of the bar on the margins of the holes will ordinarily be sufficient to prevent it from being accidentally displaced.

At its front end of the sides of the guards may be cut away along oblique lines leading upwardly and forwardly from the lower margins, as indicated at 27, and, as above stated, the guards are supported by the links 14 with their lower margins a short distance above normal ground level. When the cultivator is in motion, if the front end of any one of the guards strikes an obstruction, its motion will be checked and the linkage will allow a relative movement of the guard with reference to the teeth backwardly and upwardly, as indicated by dotted lines in Figure 2, until the obstruction is cleared, whereupon the guard will return by gravity to its normal position.

Figures 2, 3:
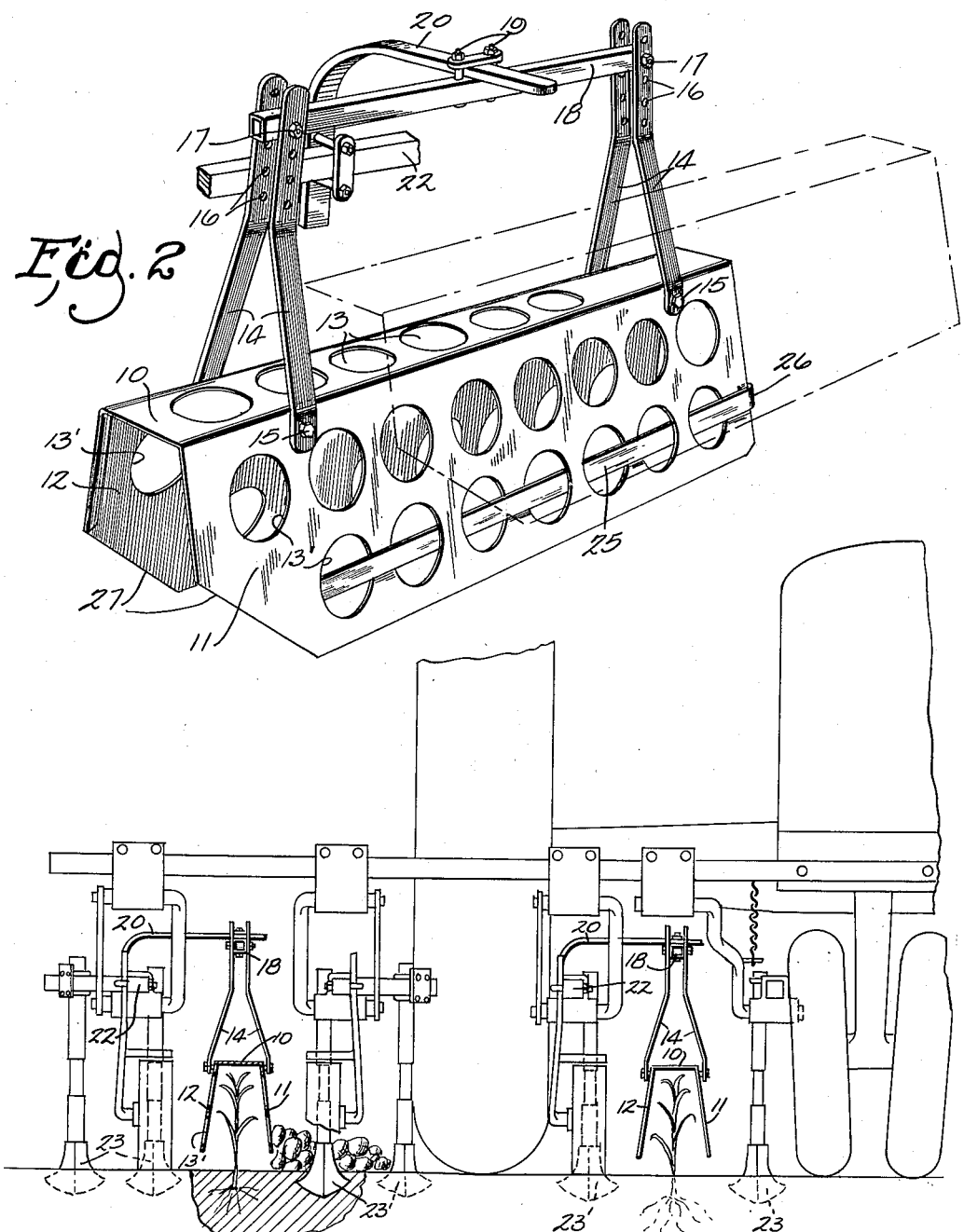
Figure 2 is a perspective of a detached plant guard embodying my invention as seen from a point of view in front and at the left of the guard, and with dotted lines indicating the position of the guard when clearing an obstruction.
Figure 3 is a schematic front elevation of a fragment of a power driven cultivator equipped with my improved guards, one of which is shown in section drawn to a vertical plane through some of the holes.

The number of guards to be used in any given cultivator depends upon the width of the cultivator and the number of rows of plants which it can simultaneously cultivate. In Figure 3, a fragment of a power driven cultivator is indicated which may be assumed to be wide enough to cultivate four rows of plants simultaneously. Two guards are therefore shown attached to the illustrated fragment of the cultivator.

Successful use of the guards for mulching purposes is quite largely dependent upon operation of the cultivator at a speed greater than that of the ordinary horse drawn cultivator, and upon having the lower margins of the guard normally above the surface of the ground and the holes of a considerable size, i. e., of two to four inches in diameter. It is also important to the success of the guard that the capacity of at least the lower row of holes on each side be made variable in accordance with the character of the soil which is being cultivated. Any means for varying the capacity of these holes may be employed, but the use of the bar 25 is preferred because it is inexpensive and can be quickly applied and removed. It is also important that the guard be supported by linkage which allows the guard to yield rearwardly and upwardly in a vertical plane which includes the row of plants in order to pass over obstructions without otherwise shifting it out of guarding position with its top surface substantially horizontal.

By providing the links 14 with vertically extending rows of holes for reception of the connecting pivot pins 17, my improved guard can be raised in correspondence with the height of the plants and increased mulching provided for plants that are high enough and strong enough to avoid being covered by increased quantities of mulching earth thrown in their direction by the cultivator teeth.

It is also important to the success of my improved guard that sight openings 13 be provided in the top of the guard, whereby its position over the plants may at all times be observed by the operator of the cultivator.

The mulching operation may also be observed, and if the plants are being covered the guards can be lowered, or the capacity of some of the holes 13' reduced. Therefore the operator may quickly determine by observation whether the guards are properly adjusted.

I claim:

1. In a plant guard for mounting on a power driven cultivator and adjacent the soil plowing teeth thereof, a support connected with the cultivator frame, a guard of substantially U-shaped cross section mounted in inverted position on the support for movement over a row of plants during cultivation thereof, the guard having openings along one side thereof each provided with curved margins, and means for varying the effective size of the openings to pass only earth in masses below a given size and quantity said means being receivable across said openings whereby to expose portions of said curved margins to contact masses passing through said openings.

2. In a plant guard for mounting on a power driven cultivator and adjacent the soil plowing teeth thereof, a support connected with the cultivator frame, a guard of substantially U-shaped cross section mounted in inverted position on the support for movement over a row of plants during cultivation thereof, the guard having openings along the sides thereof the margins of each of said openings being curved, and quick detachable means frictionally held on the guard for varying the effective size of the openings to pass only earth in masses below a given size and quantity.

3. A plant guard for mounting on a power driven cultivator and adjacent the soil plowing teeth thereof, and comprising a support connected with the cultivator frame, a guard of substantially U-shaped cross section mounted in inverted position on the support for movement over a row of plants during cultivation thereof, the guard having substantially circular openings along the sides thereof, and a bar receivable in interlaced position through adjacent opening for varying the effective size of the openings for the passage therethrough only of earth below a given size and a given quantity.

4. A plant guard for mounting on a power driven cultivator adjacent the soil plowing teeth thereof, the guard comprising a structure connected with the cultivator frame, the guard being substantially U-shaped in cross section and mounted in inverted position on the support for movement over a row of plants during cultivation thereof, the guard having openings in series along the sides thereof, and a bar for mounting on the guard to divide the openings of a series into two parts to pass only masses of material below a given size and in a given quantity.

5. In a plant guard for mounting on a power driven cultivator and adjacent the soil plowing teeth thereof, a support connected with the cultivator frame, a guard of substantially U-shaped cross section mounted in inverted position on the support for movement over a row of plants during cultivation thereof, the guard having horizontal series of openings along the sides thereof, and a flexible bar for threading through a series of openings to divide each of the openings of said series into two parts to pass earth only in masses below a given size and quantity.

6. In a plant guard for mounting on a power driven cultivator and adjacent the soil plowing teeth thereof, a support connected with the cultivator frame, a guard of substantially U-shaped cross section mounted in inverted position from the support for movement over a row of plants during cultivation thereof, the support being adjustable for suspending the guard with its lower margin above the normal level of the ground being plowed, the guard having horizontal series of openings along the sides thereof, and a flexible bar for threading through a series of openings to divide each of the openings of said series into two parts to pass earth only in masses below a given size and quantity.

WILLIAM C. LATHERS, Jr.

REFERENCES CITED

The following references are of record in the file of this patent:

UNITED STATES PATENTS

| Number | Name | Date |
|---|---|---|
| 241,924 | Buswell | Mar. 24, 1881 |
| 248,129 | Bates | Oct. 11, 1881 |
| 359,801 | McGaugh | Mar. 22, 1887 |
| 363,426 | Showers | May 24, 1887 |
| 941,772 | Faris et al. | Nov. 30, 1909 |
| 1,733,722 | Cotner | Oct. 29, 1929 |
| 1,829,627 | Bamford | Oct. 27, 1931 |
| 2,417,597 | Hill | Mar. 18, 1947 |